United States Patent [19]

Pierce

[11] 4,027,396

[45] June 7, 1977

[54] MARKING GAUGE FOR MEASURING AND MARKING FRENCH MATS

[76] Inventor: Donald Cameron Pierce, 59 Reposa Vista, Novato, Calif. 94947

[22] Filed: Apr. 1, 1976

[21] Appl. No.: 672,795

[52] U.S. Cl. .................................. 33/96; 33/112
[51] Int. Cl.² ........................................ B43L 7/00
[58] Field of Search ............... 33/104, 95, 96, 112, 33/113, 107, 111

[56] References Cited

UNITED STATES PATENTS

| | | | |
|---|---|---|---|
| 313,197 | 3/1885 | Gaylord | 33/112 |
| 490,893 | 1/1893 | Austin | 33/99 |
| 975,079 | 11/1910 | Royal | 33/112 |
| 2,315,893 | 4/1943 | Chapin | 33/104 |
| 2,652,629 | 9/1953 | Prucker | 33/112 |
| 2,682,709 | 7/1954 | Watson | 33/107 R |
| 3,156,984 | 11/1964 | Palmer | 33/95 X |

FOREIGN PATENTS OR APPLICATIONS 718,479 11/1954 United Kingdom ............... 33/104

*Primary Examiner*—Harry N. Haroian
*Attorney, Agent, or Firm*—Owen, Wickersham & Erickson

[57] ABSTRACT

A marking gauge for measuring and marking desired distances on French mats. The gauge has a sheet shaped as an isosceles right triangle for alignment with a corner of a cutout area. An elongated rectangular member is secured to and overlies the sheet, having a short edge coinciding with the base of the triangle from the midpoint thereof to one 45° vertex thereof and a first long side leading from the midpoint of the base through the 90° vertex, bisecting it. A second long side is parallel to the first long side and extends from the 45° vertex. The rectangular member provides a pocket open along each long side and closed at each end, one end being located precisely directly above the 90° vertex. Inside the pocket is a removable marker scale having index markings along the first long side.

7 Claims, 8 Drawing Figures

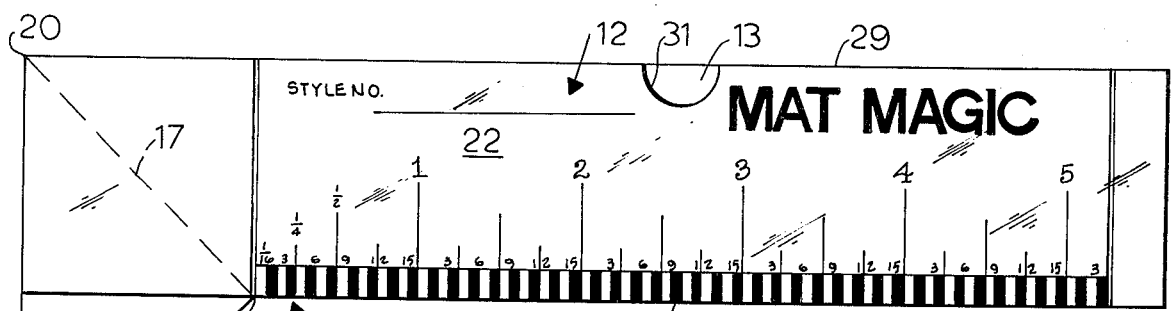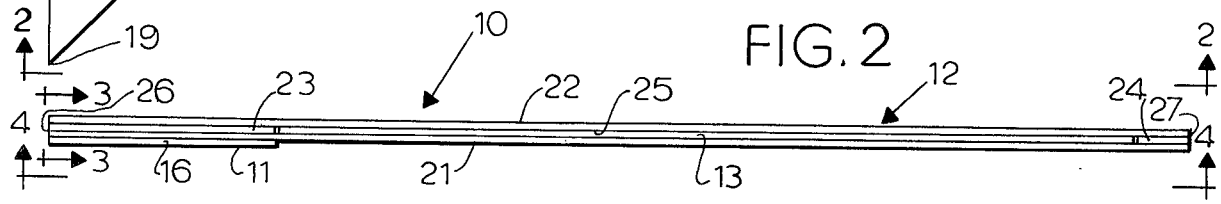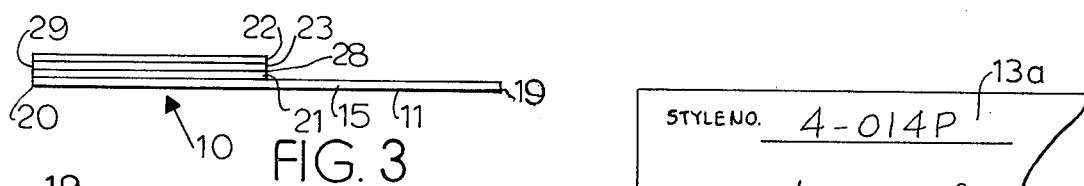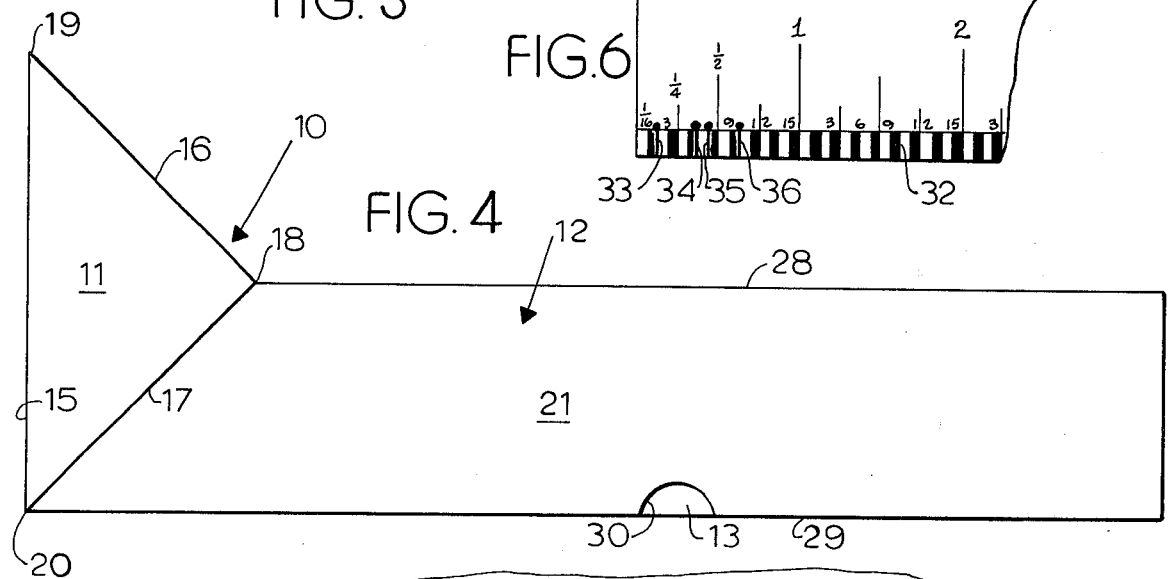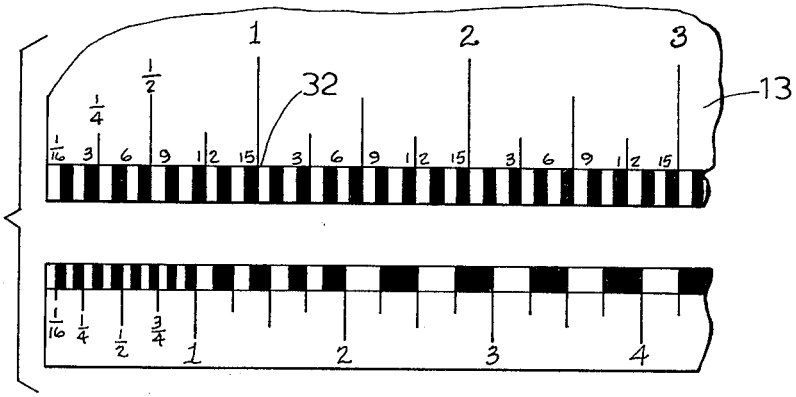

MARKING GAUGE FOR MEASURING AND MARKING FRENCH MATS

BACKGROUND OF THE INVENTION

This invention relates to a gauge for measuring and marking desired distances on such things as French mats.

French mats, called "washline mounts" in England, are classic fine-art mats, which originated in Europe. To make a fine French mat requires time, care, and practiced skill. An opening must be cut into at least one mat, and sometimes two, or three, and then ruled ink lines are generally drawn at desired intervals. These intervals may vary from mat to mat or from a particular form of mat to another particular form of mat. The mats may be, of course, of various sizes, but even when they are on the same size, taste will often dictate different spacings between the ruled ink lines. The areas between the lines may be left unfilled or may be filled in with watercolor or with other coloring material, such as a product I have devised, which is set forth in another patent application.

One of the principal problems in making a good French mat is to obtain rapidly the required accuracy in the spacing of the lines, and an important stage in the spacing is to mark the vertices of these lines on the mat adjacent each of the four corners of the cutout rectangle.

One cannot use the usual T-square without having to make two marks at each corner, and it is difficult to make these two marks sufficiently accurate so that the lines will meet at the precise, exact corner, with the spacing even on both sides. The distance of the cutout portion is exactly the same along each side margin and is usually the same for the top margin, but that is not true for the bottom margin. One can mark lines on the top portion by placing a ruler or other guide having a straight edge which bisects the mat corner and also the vertex of the adjacent cutout portion—in other words, along a line which joins the interior right angle of the cutout to the right angle of the mat itself. This, of couse, will be accurate only if the cutout is so located that the distance between the cutout and the edge of the mat itself provides the same margin on both sides. It is not, therefore, usable on the bottom of the mat or even on the top of the mat unless that condition is met, as it generally is, Even then, prior art marking devices have tended to slip. The marking may be done with pencil or with a pen, or needle held in a proper holder or wrapped with tape on one end. Even when the mark is correctly made at the two top corners of the mat, there are still difficulties in making corresponding marks at the bottom.

Another problem is that when one uses a conventional scale on the diagonal, the spacing between the lines that lie parallel to the mat edges cannot be read on the scale. To obrain the actual distance from a cutout edge to a line to be ruled, one has to multiply the spacing on the diagonally held scale by the reciprocal of the square root of two. Thus, if one is marking along a diagonal, when the scale says 1 inch it will actually indicate a marginal spacing of 0.707 inch. It is difficult to accommodate these fractions.

Other similar problems exist in similar situations.

Thus, one object of the present invention is to enable one to make a French mat more rapidly and accurately than heretofore.

Another object of the invention is to enable one who is making a French mat to do so without having to calculate the diagonal distances as irrational multiples of the marginal distances, but to reach the spacing directly and correctly on the diagonal scale in terms of the spacings between the parallel lines and edges.

Another object of the invention is to provide a gauge which can be accurately positioned and easily held in place while the marking is going on.

Another object of the invention is to provide a device in which a series of removable scales can be used. In this instance, the idea is to provide a whole series of styles or forms of mats in which, within each style or form, the lines surrounding the cutout are spaced at the same distances all around. These distances can be determined and applied to a particular pivoted scale which can easily be inserted into the assembly of this invention and become part of it, but which is also removable when one goes to a different style or when one wishes to create a new style, or form.

SUMMARY OF THE INVENTION

The invention provides a marking gauge for measuring and marking desired distances on French mats. It includes a sheet shaped as an isosceles right triangle for engagement with a right-angle corner of the mat cutout, used to align the gauge. An elongated, preferably rectangular, member is secured to the sheet, overlying half of the triangular sheet. A short edge of the rectangle coincides with the base of the isosceles right triangle, from the midpoint thereof to one 45° vertex thereof. A first long side or edge of the rectangular member leads from that midpoint through the 90° vertex of the triangle, bisecting it. Preferably, a second long side or edge lies parallel to the first long side, preferably extending from one 45° vertex.

A marker scale may be provided as an integral portion of the rectangular member, but in a preferable embodiment of the invention, a lower portion of the rectangular member overlies and is secured to the sheet, while an upper transparent face is joined to it by spacer portions, thereby providing a pocket open along each long side and closed at each end. One end of the pocket is located precisely directly above said 90° vertex. Inside the pocket is a removable marker scale having index markings along said first long side.

The marker scale may be marked in conventional units, such as centimeters or inches with suitable divisions thereof as in sixteenths of an inch with quarters and halves clearly differentiated, or in tenths for centimeters. However, although the markings correspond with the conventional markings, a feature of this invention is the preferred use of scales in which the actual spacing of the units is not what the mark says but is the product of that times the square root of two. Thus, a mark for one inch will actually measure 1.414 inch, and a mark for one centimeter will be 1.414 centimeter. This enables one to mark along the diagonal a distance that corresponds to an exact marginal distance, since the actual distance of the scale divided by 1 $\sqrt{2}$ will equal the distance indicated. In other words, $\sqrt{2}/\sqrt{2} = 1$.

The marker scale being removable, it is quite easy to create a series of styles or forms of mat in which particular markings are made that are to be repeated from mat to mat. For example, one may have a mat in which the marks are made so that lines can be drawn at ⅜th inch, ⅞th inch, and 1 inch. A form of this can be set up given a style number which is marked on the scale, used for a series of mats, then filed away and reused whenever that style is to be used again. Similarly, different styles can be created. In the first instance, the marks may be made with a plain indexed scale, and then the indexed scale may be removed and the style marker inserted and marked at that time. Or the style marker may be made by simply marking a plain indexed scale and then inserting it into the device.

Other objects, advantages, and features of the invention will appear from the following description of a preferred embodiment and of its use.

BRIEF DESCRIPTION OF THE DRAWINGS

In the drawings:

FIG. 1 is a top plan view of a marking gauge embodying the principles of the invention.

FIG. 2 is a view in front elevation of the device of FIG. 1.

FIG. 3 is a view in end elevation of the gauge of FIGS. 1 and 2.

FIG. 4 is a bottom view of the gauge of FIGS. 1 to 3.

FIG. 5 shows a comparison between a true scale on the bottom and a special scale of the present invention above it.

FIG. 6 is a fragmentary view of a portion of a marking scale adapted for a particular style.

DESCRIPTION OF A PREFERRED EMBODIMENT

Figure 7:
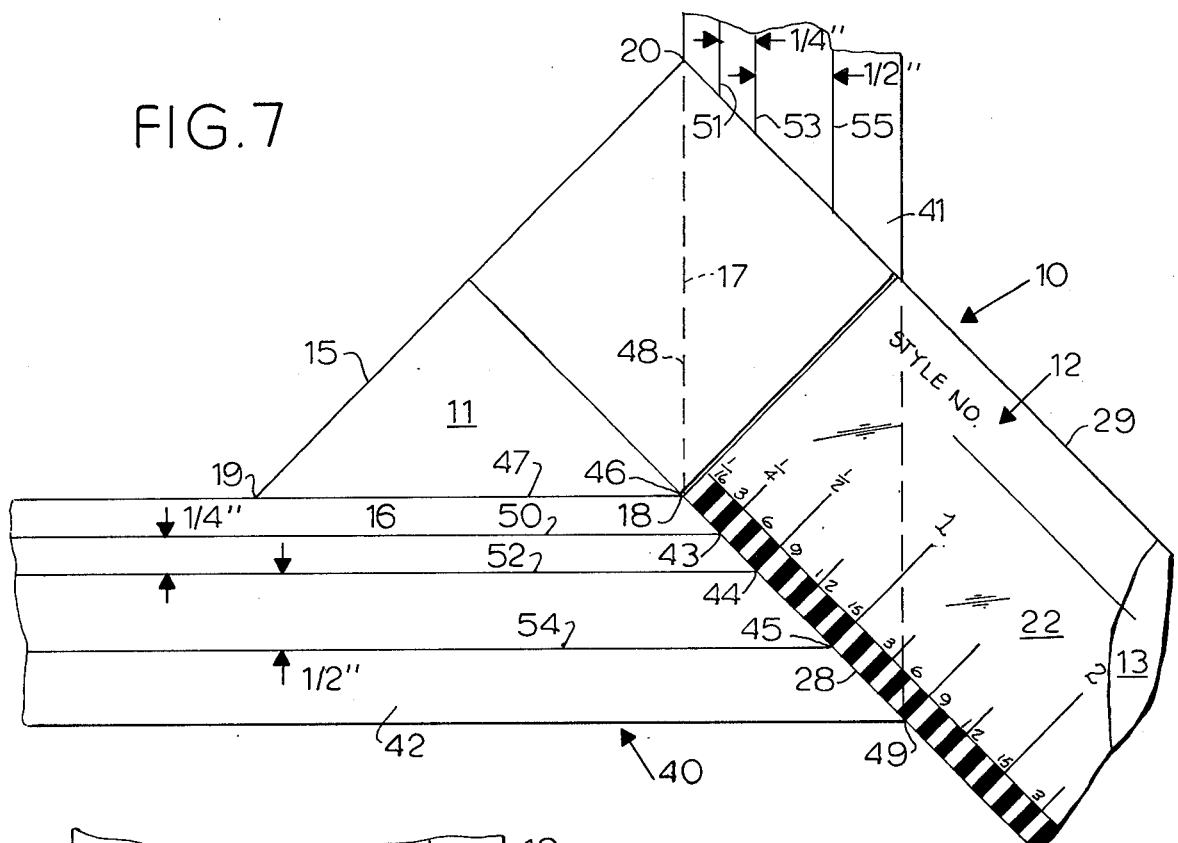
FIG. 7 is a fragmentary view showing a marking gauge of the invention in use on a French mat at a top corner, with the mat inverted.

The drawings indicate a preferred embodiment and how it may be used. A marking gauge 10 is shown which is comprised basically of three elements in this instance: a bottom triangular sheet 11, a rectangular member 12, and a removable marker strip 13. The triangular sheet 11 and the rectangular member 12 may, if desired, be made as an integral member, but they are usually more easily made of separate members secured together by cement, and in fact the member 12 itself is usually more easily made as a composite. The members 11 and 12 are usually made of plastic with at least a portion of the member 12 comprising a transparent top face while the marker strip or scale 13 may be made of stiff paper with printing thereon. A less satisfactory way of practicing the invention is to combine the marker strip 13 with the rectangular member and print the scale directly on the upper face of the rectangular member 12. However, this precludes the use of different inserts which is a very desirable feature.

The triangular sheet 11 is preferably cut in the form of an isosceles right triangle, preferably from opaque or translucent plastic so that it is clearly visible to the worker. Thus, the triangle has a base 15 and two sides 16 and 17 that converge at a vertex 18, which is a right angle. The sides 15 and 16 converge at a vertex 19, and the sides 15 and 17 converge at a vertex 20, the vertices 19 and 20 being 45° angles. The purpose of the triangular sheet 11 is to engage, in turn, each corner of a rectangular cutout of the mat and to provide accurate positioning and retention while the marker 13 is being used. This is a great help in securing accurate marking.

The rectangular member 12 preferably provides a lower opaque or translucent sheet 21, an upper transparent face 22, and spacing portions 23 and 24 at each end which are preferably opaque or translucent. These are cemented together so as to provide a pocket 25 between the upper transparent face 22 and the lower sheet 21 of the rectangular member 12. The spacer members 23 and 24 and the transparent member 22 may extend all the way to the ends 26 and 27 of the lower member 21 to make a solid rectangle, conforming exactly in size with that of the lower portion 21 or the face 22 may be shorter, if desired, and the spacers 23 and 24 set back from the ends. One system tends to look cleaner, the other tends to save plastic.

An important feature of the invention is the superpositioning of the rectangular assembly 12 on the lower sheet 11. This is done in such a way that one long edge 28 of the rectangle 21 extends precisely through the 90° vertex 18. Preferably, the rectangle 21 then extends on to the base 15, bisecting the 90° angle and then conforming at its end 26 exactly to the base 15. Thus, it overlies exactly one-half of the triangle 11 when made in the preferable shape shown, wherein a second edge 29 extends precisely from the 45° vertex 20 out parallel to the main edge 28. Thumbhole recesses 30 and 31 may be cut in both the upper and lower sheets 21 and 22 of the rectangular member 12 to make removal of the scale 13 easier.

It is important that the pocket 25 and the scale 13 which is inserted in it be oriented so that the origin point of the scale 13 directly overlies the 90° vertex 18. This means that the actual distance from the corner of the cutout portion of the mat will be measured. For this reason, it is preferable that the scale 13 have a reasonably snug fit in between the two end spacer portions 23 and 24. While it is possible to have the scale 13 narrower than the pocket 25 or wider than the pocket 25, it makes a cleaner-looking article and one that is more convenient to use if they coincide substantially exactly in size. For the same reason it is preferable to have the pocket 25 open at both edges 28 and 29 rather than along one edge only, although so long as the marking edge 28 is open, it is not essential that the other edge 29 be open. Yet, to have both edges 28 and 29 open is more convenient, and superior results are obtained in insertion and removal of the scale 13.

As shown in FIG. 5, the scale 13 is marked in an unusual way. The markings 32, which in this instance are to correspond to inches, are marked just as though they were inches and fractions of an inch, but the actual distances are those of the units multiplied by the square root of two, so that the 1-inch mark occurs at 1.414 inch and the 2-inch mark at 2.828 inch, and so on, the actual markings being as close as possible to the product of the square root of two ($\sqrt{2}$) times the unit indicated. The same may be done with the metric scale, of course. As stated before, this enables the user to use the mark 32 on the diagonal while indicating the actual marginal distances he is to obtain.

The user may purchase a series of insertable, removable marking members 13, all of which may be marked with the index marking, or some of them may be blank, if desired. FIG. 6 shows how on marker 13a having the index 32 on it can be marked to enable use when making a particular series of lines. Marks 33, 34, 35, and 36 may be placed on the scale 13 before the first mat is marked, or may be placed on the scale after a first mat has been marked, so that subsequent ones, in any event, will correspond to it. A simple blank scale may be used if desired to put that in, but the superposition over the marked scale 32 enables the user to have in front of him at all times the actual distances he is marking.

To assemble the unit 10, the various members, when cut basically as described, are simply cemented together. So far as the members 11 and 12 are concerned, care being taken always to get exact alignment. The printed scale 13 is, of course, freely insertable and removable.

Figure 8:
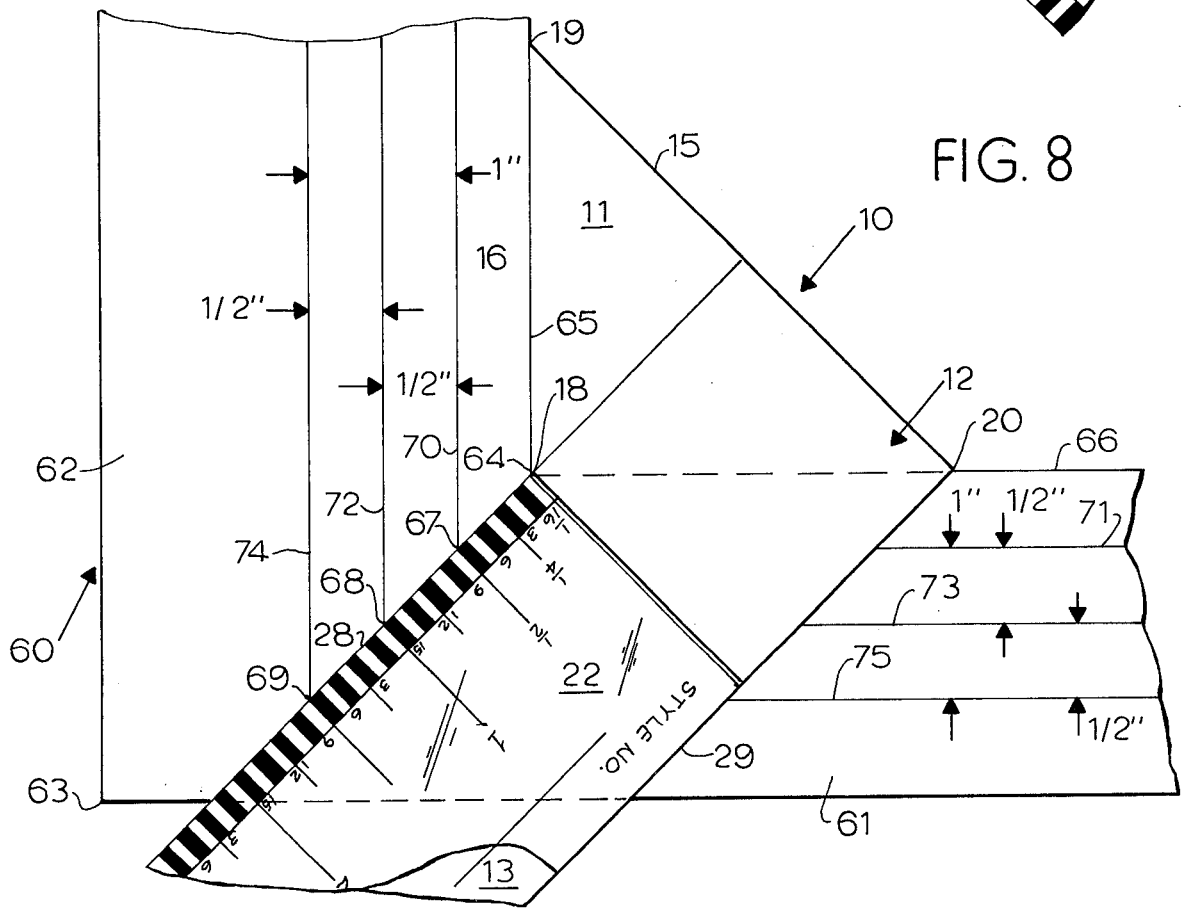
FIG. 8 is another fragmentary view showing the gauge also in use for marking a French mat but doing so in this instance on one of the bottom corners, where the spacing of the margins is larger at the bottom than at the sides, the mat being turned on its side.

Typical use of the marking gauge 10 is illustrated in FIGS. 7 and 8. FIG. 7 illustrates the use of the gauge 10 with a mat 40 in which the side margin 41 and the bottom margin 42 (or it may be actually the top margin inverted), are identical, whereas FIG. 8 indicates the use of the device 10 with a mat 60 where the two margins 61 and 62 are of different width. For example only, and without any recommendation of these distances being used, the markings in FIG. 7 are shown to be in one to provide vertices 43, 44, and 45 giving line spacings of ¼ inch, ½ inch, and 1 inch. The scale 10 is set in place with the vertex 18 resting against the rectangular corner 46, then the side 16 rests against one edge 47 of the cutout and the side 17 rests against the other edge 48 of the cutout. With the gauge 10 in place, the rectangular portion 12 extends right from the corner 47 over the corner 49 of the mat 40, marking a true diagonal but without relaying on that diagonal, in case the margins 41 and 42 are slightly inaccurate. Taking then a pin or needle, the operator makes his marks 43, 44, and 45 according to the scale at ¼ inch, ½ inch, and 1 inch, although in reality the diagonal distances are the products of each of these distances times the square root of 2; he then has the correct parallel spacings for the lines, which is what he is interested in, that is, the space between the edge 47 and the first line 50 is ¼ inch, just as is the space beteen the edge 48 and the line 51. Similarly, the distance from the edge 47 to the line 52 is ½ inch just as the distance from the edge 48 to the line 53 is ½ inch. Furthermore, the distance from the edge 47 to the line 54 in 1 inch, and that is the same as the distance between the edge 48 and the line 55. After marking each one of the points 43, 44, and 45 with a pin or needle, the operator goes to the next corner and does the same, and to the third corner and to the fourth corner, doing the same in each corner. He then can place his regular straight edge so that it lies from one of the impressions made by the needle to the next and draw his lines 50, 51, 52, 53, 54, 55, and so on, accordingly in the normal manner.

In a typical mat, the bottom margin of the mat is different from the side margins, as is shown in FIG. 8, although the bottom margin 62 of the mat 60 is here shown at the left side. Here again the operation is exactly the same, even though in this instance the gauge 10 does not pass through the corner 63 of the mat itself. It is still aligned with the cutout corner 64 and with the cutout sides 65 and 66. This illustrates the fact that no reliance is made upon the corner 63 and that, so far as FIG. 7 is concerned, the gauge 10 serves more to check the accuracy of the mat 40 and the location of its cutout than for marking purposes, and here the corner 63 is not relied on at all.

Again, impressions 67, 68, and 69 are made with a pin or needle, although a hard pencil may be used, if desired. The lines 70, 71, 72, 73, 74, and 75 are then drawn in the usual manner, with the distances being quite accurate if the instructions are faithfully followed.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A marking gauge for measuring and marking desired distances on such things as French mats having a rectangular cutout area with right-angle corners, where it is desired to surround said cutout area with ruled lines and the like, comprising:

a sheet shaped to provide a right-angle vertex for engagement with a said right-angle corner, in order to align said gauge, an elongated member secured to and overlying said sheet, having a long rectilinear edge passing through said vertex and bisecting said ring angle, said elongated member including a lower portion overlying and secured to said sheet, an upper transparent face member, and spacing means for joining said lower portion to said face member and for providing therewith a pocket open along said rectilinear edge and closed at each end, one end being located precisely directly above said vertex, and a marker scale in said pocket and having index markings along said rectilinear edge.

2. The marking gauge of claim 1 having said index markings marked in conventional units but spaced as the product of said conventional units and the square root of 2.

3. A marking gauge for measuring and marking desired distances on such things as French mats having a rectangular cutout area with right-angle corners, when it is desired to surround said cutout area with ruled lines and the like, comprising:

a sheet shaped to provide a right-angle vertex for engagement with a said right-angle corner, in order to align said gauge, an elongated member secured to and overlying said sheet, having a long rectilinear edge passing through said vertex an bisecting said right angle, said elongated member including a lower portion overlying and secured to said sheet, an upper transparent face member, and spacing means for joining said lower portion to said face member and for providing therewith a pocket open along said rectilinear edge and closed at each end, one end being located precisely directly above said vertex, and a marker scale removably inserted in and the same length as said pocket.

4. A marking gauge for measuring and marking desired distances on French mats having a rectangular cutout area with right-angle corners, when it is desired to surround said cutout area with ruled lines and the like, comprising:

a sheet shaped as an isosceles right triangle for engagement with said right-angle corner, in order to align said gauge, said sheet having a base, a 90° vertex, and two 45° vertices, an elongated rectangular member secured to an overlying one-half of said sheet, having a short edge coinciding with said base from the midpoint thereof to one 45° vertex thereof, a first long side leading from said midpoint through said 90° vertex, bisecting it, and a second long side parallel to said first long side extending from said one 45° vertex, said rectangular member including a lower portion overlying and secured to said sheet, an upper transparent face member, and two spacers joining said lower portion to said face member and providing therewith a pocket open along each said long side and closed at each end along a line perpendicular to said long sides, one end being located precisely at a point directly above said 90° vertex, and a removable marker scale retained in said pocket and substantially filling it.

5. The marking gauge of claim 4 wherein said marker scale carries a scale on one edge spaced as conventional units multiplied by the square root of 2.

6. The marking gauge of claim 4 wherein said rectangular member comprises three layers, said lower portion, said spacer portions, one being at each end and directly overlying the ends of said lower portion, and said upper transparent face member, which is the same rectangular size as said lower portion.

7. The marking gauge of claim 4 having a thumbhole recess along said second edge for enabling easier removal of a said marker scale.

* * * * *

UNITED STATES PATENT AND TRADEMARK OFFICE
CERTIFICATE OF CORRECTION

PATENT NO. : 4,027,396
DATED : June 7, 1977
INVENTOR(S) : Donald Cameron Pierce

It is certified that error appears in the above-identified patent and that said Letters Patent are hereby corrected as shown below:

Column 1, line 58, "obrain" should read --obtain--.

Column 2, line 4, "reach" should read --read--.

Column 2, line 18, "become part" should read --become a part--.

Column 4, line 63, "on marker" should read --one marker--.

Column 5, line 42, "54 in 1 inch" should read --54 is 1 inch--.

Column 6, line 21, which is line 11 of claim 1, "ring angle" should read --right angle--.

Column 6, line 45, which is line 11 of claim 3, "an bisecting" should read --and bisecting--.

Column 6, line 61, which is line 7 of claim 4, "with said" should read --with a said--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks